US008269847B2

(12) United States Patent
Nagatomo et al.

(10) Patent No.: US 8,269,847 B2
(45) Date of Patent: Sep. 18, 2012

(54) IMAGE PROCESSING APPARATUS, IMAGE PROCESSING METHOD, AND NON-TRANSITORY RECORDING MEDIUM FOR SELECTIVELY CREATING ONE OF AN ANIMATION FILE AND A MOVING IMAGE FILE FROM A PLURALITY OF CONTINUOUSLY SHOT IMAGES

(75) Inventors: Shoichi Nagatomo, Fussa (JP); Akihiro Tsukamoto, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 257 days.

(21) Appl. No.: 12/757,285

(22) Filed: Apr. 9, 2010

(65) Prior Publication Data
US 2010/0265337 A1 Oct. 21, 2010

(30) Foreign Application Priority Data

| Apr. 17, 2009 | (JP) | ................................ 2009-100423 |
| Jan. 26, 2010 | (JP) | ................................ 2010-013692 |
| Feb. 5, 2010 | (JP) | ................................ 2010-023642 |

(51) Int. Cl.
*H04N 5/232* (2006.01)
*H04N 5/225* (2006.01)
*H04M 1/00* (2006.01)
*G06F 3/048* (2006.01)

(52) U.S. Cl. ............... 348/211.2; 348/220.1; 455/556.1; 715/800

(58) Field of Classification Search ............... 348/211.2, 348/211.1, 220.1, 240.2, 333.05, 333.12; 715/238, 800
See application file for complete search history.

(56) References Cited

U.S. PATENT DOCUMENTS

| 6,253,231 | B1 * | 6/2001 | Fujii | ............................ 709/206 |
| 6,460,075 | B2 * | 10/2002 | Krueger et al. | ............... 709/206 |
| 6,642,959 | B1 * | 11/2003 | Arai | ........................... 348/231.3 |
| 6,963,903 | B2 * | 11/2005 | Krueger et al. | ............... 709/206 |

(Continued)

FOREIGN PATENT DOCUMENTS

EP 1349407 A2 * 10/2003
(Continued)

OTHER PUBLICATIONS

Japanese Office Action dated May 10, 2011 (and English translation thereof) in counterpart Japanese Application No. 2010-023642.

Primary Examiner — John Villecco
(74) Attorney, Agent, or Firm — Holtz, Holtz, Goodman & Chick, PC

(57) ABSTRACT

When an instruction of shooting a moving image is given in a mail writing mode, a mobile communication terminal detects the instruction, controlling an image pick-up unit 10 and image pick-up controlling unit 12 to continuously shoot images for a certain period of time. Plural images are obtained and displayed live for a certain period of time. When non image-moving region is found in all the plural obtained images and is included in the image displayed live, the non image-moving regions of MPEG format are subjected to a transparent process, and an animation file of GIF format is created. Mail data is read from a memory 15 and a description is given to display in line an animation GIF icon of the animation file at a current cursor position in the mail in the process of writing.

13 Claims, 13 Drawing Sheets

U.S. PATENT DOCUMENTS

| | | | |
|---|---|---|---|
| 7,365,787 B2* | 4/2008 | Nobels | 348/333.02 |
| 7,391,526 B2* | 6/2008 | Nishimura | 358/1.15 |
| 7,432,954 B2* | 10/2008 | Hama | 348/211.2 |
| 7,953,426 B2* | 5/2011 | Kim | 455/466 |
| 8,018,518 B2* | 9/2011 | Nobels | 348/333.02 |
| 2003/0122922 A1* | 7/2003 | Saffer et al. | 348/14.01 |
| 2003/0185191 A1* | 10/2003 | Nagatomo et al. | 370/338 |
| 2005/0021803 A1* | 1/2005 | Wren | 709/231 |
| 2005/0190279 A1* | 9/2005 | Nobels | 348/333.02 |
| 2006/0010222 A1* | 1/2006 | Cleron et al. | 709/206 |
| 2008/0074443 A1* | 3/2008 | Taniguchi et al. | 345/659 |
| 2008/0165259 A1* | 7/2008 | Nobels | 348/231.2 |
| 2009/0030991 A1* | 1/2009 | Vakkalanka | 709/206 |
| 2009/0210778 A1* | 8/2009 | Kulas et al. | 715/201 |
| 2011/0037767 A1* | 2/2011 | Casanova et al. | 345/473 |
| 2011/0122293 A1* | 5/2011 | Yamada et al. | 348/231.6 |
| 2011/0176010 A1* | 7/2011 | Houjou et al. | 348/207.1 |
| 2012/0019682 A1* | 1/2012 | Nobels | 348/211.1 |

FOREIGN PATENT DOCUMENTS

| | | | |
|---|---|---|---|
| JP | 10027255 A * | 1/1998 | |
| JP | 2001-027977 A | 1/2001 | |
| JP | 2004-201191 A | 7/2004 | |
| JP | 2004-310352 A | 11/2004 | |
| JP | 2005196289 A * | 7/2005 | |
| JP | 2005252841 A * | 9/2005 | |
| JP | 2005-346252 A | 12/2005 | |
| JP | 2007-026090 A | 2/2007 | |
| JP | 2009026089 A * | 2/2009 | |

* cited by examiner

FIG. 4E

IMAGE PROCESSING APPARATUS, IMAGE PROCESSING METHOD, AND NON-TRANSITORY RECORDING MEDIUM FOR SELECTIVELY CREATING ONE OF AN ANIMATION FILE AND A MOVING IMAGE FILE FROM A PLURALITY OF CONTINUOUSLY SHOT IMAGES

CROSS REFERENCE TO RELATED APPLICATIONS

The present application is based upon and claims the benefit of priority from the prior Japanese Application No. 2009-100423, file on Apr. 17, 2009, Japanese Patent Application No. 2010-013692, filed on Jan. 26, 2010, and Japanese Patent Application No. 2010-023642, filed on Feb. 5, 2010, entire contents of which are incorporated herein by reference.

BACKGROUND OF THE INVENTION

1. Field of the Invention

The present invention relates to an image processing apparatus, image processing method, and recording medium, and more particularly, to an image processing apparatus, image processing method, and recording medium, which create an file using images shot continuously.

2. Description of the Related Art

Conventional techniques are available, which create electronic documents rich in expression power using a description language such as HTML (Hyper Text Markup Language), and send the electronic documents as message contents of electronic mails. The description language is used to make look-nice documents.

In recent, communication terminals such as cellular phones are available, which have a document creating function for writing electronic mails, wherein the document creating function uses the above description language.

More specifically, Japanese Patent No. 2004-310352 A discloses a communication terminal, which previously stores image files of GIF (Graphics Interchange Format) format, and inserts the image file into an electronic document to be displayed, decorating and making the same document look nice.

Further, Japanese Patent No. 2004-2011991 A discloses a communication terminal, which has a built-in camera and attaches a moving image file shot with the built-in camera to electronic mails. Japanese Patent No. 2005-346252 A discloses a communication terminal, which creates electronic mails consisting of characters mixed with pictograms.

Nowadays, many techniques are available for creating documents rich in expression power.

As described above, to use the image files of GIF format previously stored in the communication terminal is advantageous in data volume of whole documents and burden of drawing process in the communication terminal. But since only the image files stored in the communication terminal can be used, there is a problem that the mode of expression is restricted.

To attach to mails moving image files shot with the built-in camera is more advantageous in expression power than the above technique, but there is a problem that usage of the moving image files is not advantageous in data volume of whole documents and burden of drawing process in the communication terminal.

SUMMARY OF THE INVENTION

The present invention has been made to solve the above problems involved in the conventional techniques, and has an object to provide an image processing apparatus for creating electronic documents that are dynamic and rich in expression power using an image processing technique.

According to one aspect of the invention, therein provided an image processing apparatus, which comprises a document creating unit for creating a document including characters, a displaying unit for displaying data, an image pick-up unit for shooting an object, an image pick-up controlling unit for controlling the image pick-up unit to continuously shoot an object, thereby obtaining a plurality of continuously shot images, a selecting unit for selecting between creating an animation file and creating a moving image file from the plurality of continuously shot images obtained by the image pick-up controlling unit, a first creating unit for creating an animation file using the plurality of continuously shot images obtained by the image pick-up controlling unit, when the selecting unit selects creating an animation file, wherein the plurality of continuously shot images are used as frames of the animation file, a second creating unit for creating a moving image file using the plurality of continuously shot images obtained by the image pick-up controlling unit, when the selecting unit selects creating a moving image file, wherein the plurality of continuously shot images are used as frames of the moving image file, a first display controlling unit for controlling the displaying unit to display characters of the document created by the document creating unit with the animation file inserted between the characters of the document, wherein the animation file is created by the first creating unit, and a second display controlling unit for controlling the displaying unit to display the moving image file created by the second creating unit as an attachment file to the document created by the document creating unit.

According to another aspect of the invention, there is provided an image processing method, which comprises an inputting step of inputting a plurality of continuously shot images, a selecting step of selecting between creating an animation file and creating a moving image file from the plurality of continuously shot images, a first creating step of creating an animation file using the plurality of continuously shot images, when creating an animation file is selected, wherein the plurality of continuously shot images are used as frames of the animation file, a second creating step of creating a moving image file using the plurality of continuously shot images, when creating a moving image file is selected, wherein the plurality of continuously shot images are used as frames of the moving image file, a first display controlling step of controlling to display characters of a document file with the created animation file inserted between the characters of the document file, and a second display controlling step of controlling to display the created moving image file as an attachment file to the document file.

According to still another aspect of the invention, there is provided a computer readable recording medium having a computer program recorded thereon, the computer program when executed to make a computer execute the steps, which comprise an inputting step of inputting a plurality of continuously shot images, a selecting step of selecting between creating an animation file and creating a moving image file from the plurality of continuously shot images, a first creating step of creating an animation file using the plurality of continuously shot images, when creating an animation file is selected, wherein the plurality of continuously shot images are used as frames of the animation file, a second creating step of creating a moving image file using the plurality of continuously shot images, when creating a moving image file is selected, wherein the plurality of continuously shot images are used as frames of the moving image file, a first display controlling step of controlling to display characters of a document file with the created animation file inserted between the characters of the document file, and a second display controlling step of controlling to display the created moving image file as an attachment file to the document file.

BRIEF DESCRIPTION OF THE DRAWINGS

FIGS. 4A to 4F are views illustrating creation of an animation file.

DETAILED DESCRIPTION OF THE PREFERRED EMBODIMENTS

First Embodiment

Hereinafter, a first embodiment, in which the present invention is specifically applied to a mobile communication terminal will be described in detail.

Figure 1:
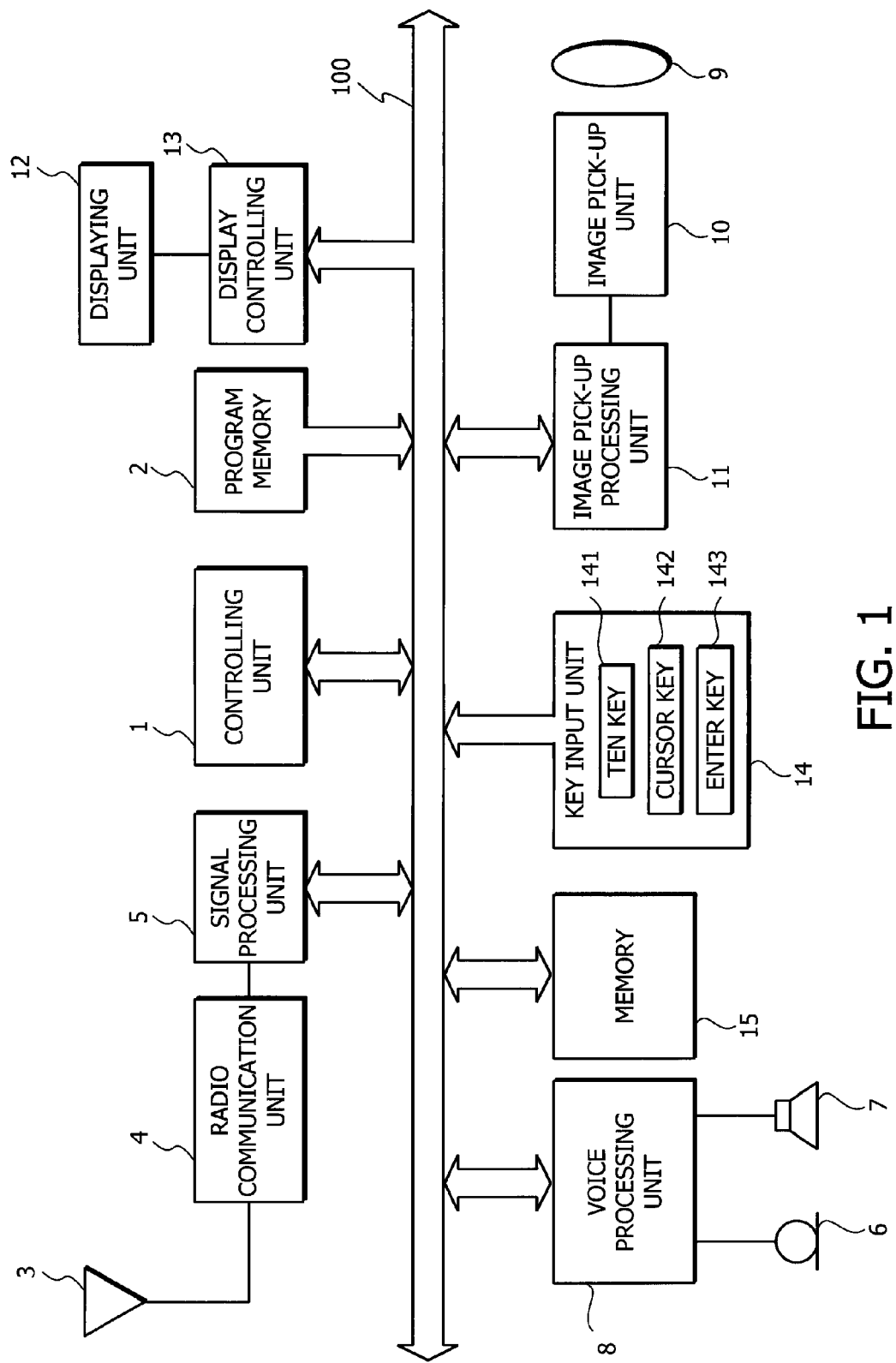
FIG. 1 is a block diagram of a circuit configuration of a mobile communication terminal with an image pick-up function using the present invention in a first embodiment.

FIG. 1 is a block diagram of a circuit configuration of the mobile communication terminal with an image pick-up function using the invention. As shown in FIG. 1, the mobile communication terminal is provided with a controlling unit 1, which controls operation of the whole circuit configuration of the mobile communication terminal. Further, the mobile communication terminal comprises a program memory 2, signal processing unit 5, voice processing unit 8, image pick-up processing unit 11, display controlling unit 13, key input unit 14, and memory 15. These elements are electrically connected with each other through a bus 100.

Figure 2:
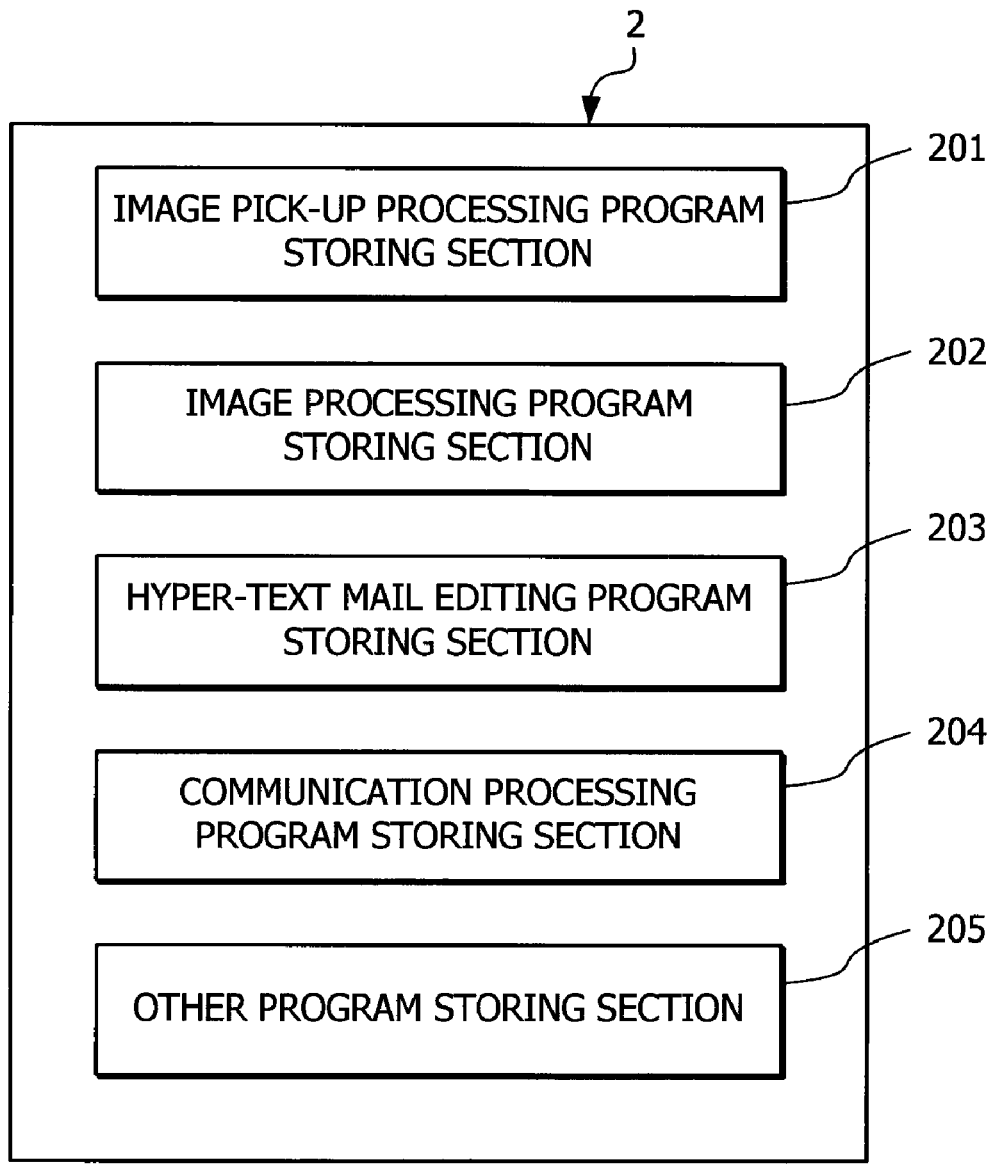
FIG. 2 is a view showing on a conceptual basis, contents of a program memory of the mobile communication terminal.

The program memory 2 is used to store programs, which the controlling unit 1 executes to operate the mobile communication terminal. More specifically, as shown in FIG. 2, the program memory 2 has storing sections for storing various programs for the controlling unit 1 to perform the present invention, and another program storing section 205 for storing other programs, wherein the storing sections include an image pick-up processing program storing section 201, image processing program storing section 202, hyper-text mail editing program storing section 203, and communication processing program storing section 204. The programs are read from these storing sections in response to an instruction given by the controlling unit 1.

Note that FIG. 2 is a view showing contents of the program memory 2 on a conceptual basis and is prepared for the purpose of easy understanding of the invention. Contents of the executed various programs can be included in FIG. 2.

A radio communication unit 4 serves to receive a radio signal from an antenna 3 under control of the signal processing unit 5, and performs a primary modulation/primary demodulation process of a predetermined radio modulation/demodulation system such as DMA system. Under control of the controlling unit 1, the signal processing unit 5 receives voice data subjected a digital process of CELP, mail data, animation GIF file, and moving image file via the bus 100, and modulates the received data and files using. QPSK system and outputs the modulated data and files to the radio communication unit 4. Meanwhile, the signal processing unit 5 demodulates data received from the radio communication unit 4 and outputs the demodulated data to the bus 100. The voice processing unit 8 encodes voice data sent from a microphone 6 using CELP technique. Meanwhile, the voice processing unit 8 receives CELP encoded data from the bus 100, and converts the data into a voice signal, outputting from a speaker 7.

An image pick-up unit 10 comprises an image capture device such as CMOS and CCD, and digital signal processors (DSP). The image pick-up unit 10 performs a digital process on an image focused thereon through a lens 9. The image pick-up processing unit 11 serves to control drive of the image capture device of the image pick-up unit 10 (more specifically, continuous reading process), and outputs a digital picked-up image to the bus 100. The displaying unit 12 displays various sorts of data (mail data, animation GIF files and moving images) sent through the display controlling unit 13 under control of the controlling unit 1.

The key input unit 14 comprises ten keys 141, a cursor key 142 and an enter key 143. The ten key 141 is used to input phone numbers and to detect input of characters and numerals. The cursor key 142 is used to detect a designated position of a current cursor in a mail writing mode to be described later. The enter key 143 is used to make various decisions and to detect an instruction of shooting and/or recording an image.

The memory 15 is used as a work memory (application heap) while the controlling unit 1 is executing the various programs stored in the program memory 2. Further, the memory 15 is used to store still image files obtained in shooting operations, and to store moving image files, animation files, and various sorts of down-lorded data.

Figure 3:
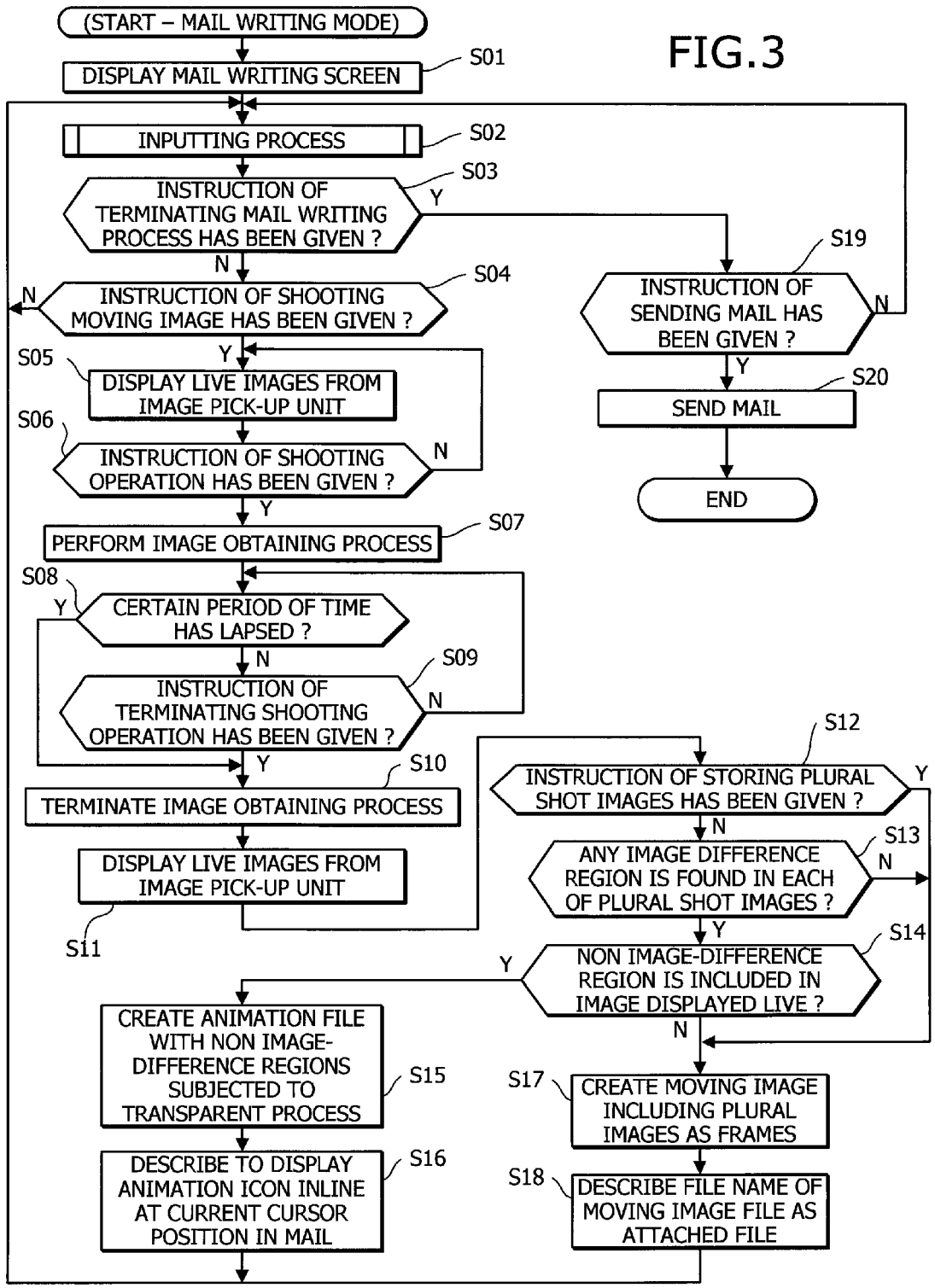
FIG. 3 is a flow chart of a process to be performed in a mail writing mode in the first embodiment.
Figure 4A:
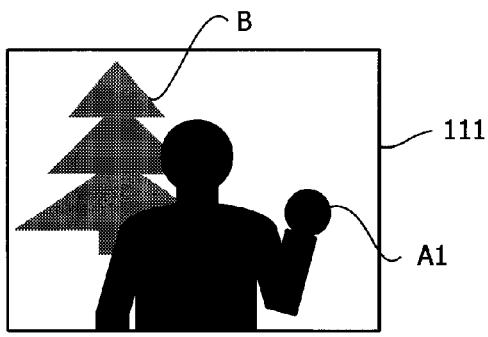
Figure 4F:
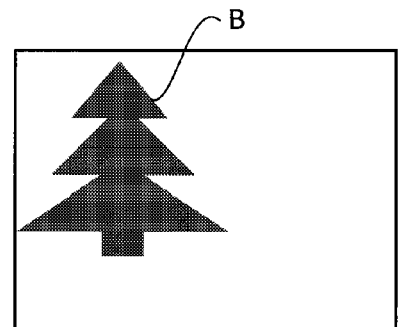
Figure 4B:
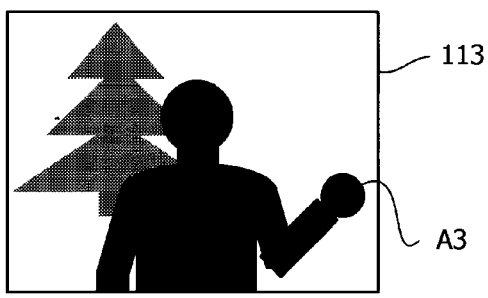
Figure 4C:
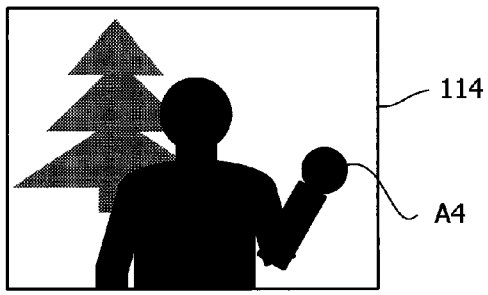
Figure 4D:
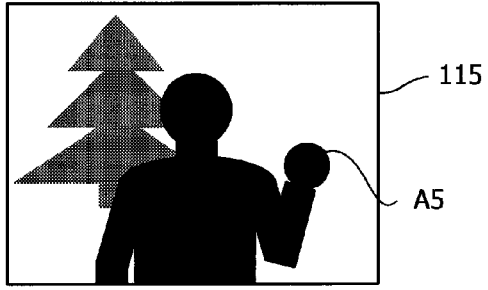

FIG. 3 is a flow chart of a process to be performed by the mobile communication terminal in the mail writing mode.

When a power is turned on, the mobile communication terminal reads and executes a program from the communication processing program storing section 204 in the program memory 2, performing a negotiation process and a communication process with an external radio communication network. And when the mail writing mode has been set, the controlling unit 1 reads and executes a program from the hyper-text format mail editing program section 203 of the memory 2 and displays a mail writing screen on the displaying unit 12 at step S01.

The controlling unit 1 detects a user's operation of the ten key 141, the cursor key 142, and the enter key 143, performing an inputting process of an electronic document (contents of an electric mail), whereby a mail is written at step S02.

Further, the controlling unit 1 judges at step S03 whether or not an instruction of terminating a mail writing process has been given or detected.

Note that since the mail to be written or produced in the mail writing process is of a hyper text format, not only characters are entered, but contents which are designated with Html format tags can be edited at will. For example, character color and background color can be edited, sizes of character fonts can be changed, characters can be scrolled, and further a layout of the mail can be changed.

When the instruction of terminating the mail writing process has been detected (YES at step S03), the controlling unit 1 judges at step S19 whether or not an instruction of sending the written mail has been given or detected. When the instruction of terminating the mail writing process has not been detected (NO at step S03), the controlling unit 1 judges at step S04 whether or not an instruction of shooting a moving image has been given or detected. The judgment is made based on whether or not a certain operation has been performed on the input unit 14.

When the instruction of shooting a moving image has not been detected (N0 at step S04), the controlling unit 1 returns to step S02. When the instruction of shooting a moving image has been detected (YES at step S04), the controlling unit 1 reads and executes programs from the image pick-up processing program storing section 201 and the image processing program storing section 202, thereby starting up the image pick-up unit 10 and the image pick-up processing unit 11. The controlling unit 1 temporarily stores the written mail (electronic document) in the memory 15, and meanwhile, periodically drives the image pick-up unit 10 to successively output images, and controls the image pick-up processing unit 11 and the display controlling unit 13 to display live images output successively from the image pick-up unit 10 on the displaying unit 12 at step S05.

With the live image displayed on the displaying unit 12, the controlling unit 1 judges at step S06 whether or not an instruction of shooting operation has been given or detected. The judgment is made based on whether or not the user has operated the enter key 143.

When the instruction of shooting operation has not been detected (NO at step S06), the controlling unit 1 returns to step S05. When the instruction of shooting operation has been detected (YES at step S06), the controlling unit 1 makes the image pick-up processing unit 11 and the display controlling unit 13 start and perform an image obtaining process for a certain period of time to continuously obtain images at step S07. The controlling unit 1 judges at step S08 whether or not a certain period of time has lapsed, which period corresponds to volume of a moving image file that is allowed to attach to the mail. When the certain period of time has not lapsed (NO at step S08), the controlling unit 1 judges at step S09 whether or not the instruction of terminating a shooting operation has been given or detected. The judgment is made based on whether or not the user has operated the enter key 143.

When the instruction of terminating a shooting operation has not been detected (NO at step S09), the controlling unit 1 returns to step S08. When it is determined that the certain period of time has lapsed (YES at step S08), and/or when it is determined that the instruction of terminating a shooting operation has been detected (YES at step S09), the controlling unit 1 instructs the image pick-up unit 10 and the image pick-up processing unit 11 to terminate the image obtaining process at step S10. Further, the controlling unit 1 periodically drives the image pick-up unit 10 to output images successively, and controls the image pick-up processing unit 11 and the display controlling unit 13 to display live images output successively from the image pick-up unit 10 on the displaying unit 12 at step S11.

Then, the controlling unit 1 judges at step S12 whether or not an instruction of storing plural shot images at step S07 to step S10 has been given or detected. The judgment is made based on whether or not the user has operated the enter key 143 during the period from the time the displaying unit 12 starts displaying the live images at step S11 until a certain time has lapsed.

The judgment is made to determine whether or not the user has determined to store the plural shot images as a moving image file.

In other words, when the instruction of storing plural shot images has been detected (YES at step S12), the controlling unit 1 determines that the user wants to store the plural shot images as a moving image file, and advances to step S17. When the instruction of storing plural shot images is not detected after a certain period of time has lapsed (NO at step S12), the controlling unit 1 determines to use the image which is displayed live on the displaying unit 12 as an image for detecting an image difference region in the plural shot images.

Therefore, when the instruction of storing plural shot images has not been detected (NO at step S12), the controlling unit 1 judges at step S13 whether or not any image moving region is found in all the plural shot images.

When it is determined at step S13 that an image moving region is found over the whole image regions of all the plural shot images, since it is impossible to detect images of a difference region between the plural shot images, the controlling unit 1 advances to step S17.

When it is determined at step S13 that non image-moving region is found in a part of image region of the plural shot images, since it is possible to detect images of a difference region between the plural shot images, the controlling unit 1 judges at step S14 whether or not the non image-moving region is included in the image which is currently displayed live on the displaying unit 12.

When it is determined at step S14 that the non image-moving region is not included in the image which is currently displayed live on the displaying unit 12 (NO at step S14), since it is impossible to detect a comparison region from the image which is currently displayed live on the displaying unit 12, wherein a difference region is detected from the comparison region, the controlling unit 1 advances to step S17.

When it is determined at step S14 that the non image-moving region is included in the image which is currently displayed live on the displaying unit 12 (YES at step S14), since it is possible to detect the comparison region from the image which is currently displayed live on the displaying unit 12, wherein an image difference region is detected from the comparison region, the controlling unit 1 creates an animation file of GIF format with the non image-moving regions subjected to a transparent process at step S15.

FIGS. 4A to 4F are views illustrating creation of the animation file at step S15 in FIG. 4.

Five images 111 to 115 shot at steps S07 to S10 are shown in FIGS. 4A to 4E, respectively. The images 111 to 115 have object image regions A1 to A5, respectively, and further each have an image region of an object "B".

When the image 116 is kept displayed live on the displaying unit 12 for a certain period of time at step S11, the controlling unit 1 executes the transparent process ($\alpha=0$) on pixels in the non image-moving regions of the images 111 to 115, wherein the non image-moving regions of the images 111 to 115 are image regions which exclude the object image regions A1 to A5 from the images 111 to 115, respectively.

Meanwhile, the controlling unit 1 creates an animation file of GIF format including five frames at step S15, wherein pixels in the object image region A1 of the image 111, pixels in the object image region A2 of the image 112, pixels in the object image region A3 of the image 113, pixels in the object image region A4 of the image 114, and pixels in the object image region A5 of the image 115 are used as non transparent regions ($\alpha=1$) of the animation file.

When the animation file is created at step S15, the controlling unit 1 controls the display controlling unit 13 to read the mail data temporarily stored in the memory 15 and to display the mail data on the displaying unit 12.

In accordance with the hyper-text format mail editing program, the controlling unit 1 attaches the created animation file to the mail in the process of writing and describes to display an animation GIF icon of the created animation file in line at a current position of the cursor in the mail (step S16).

Figure 5:
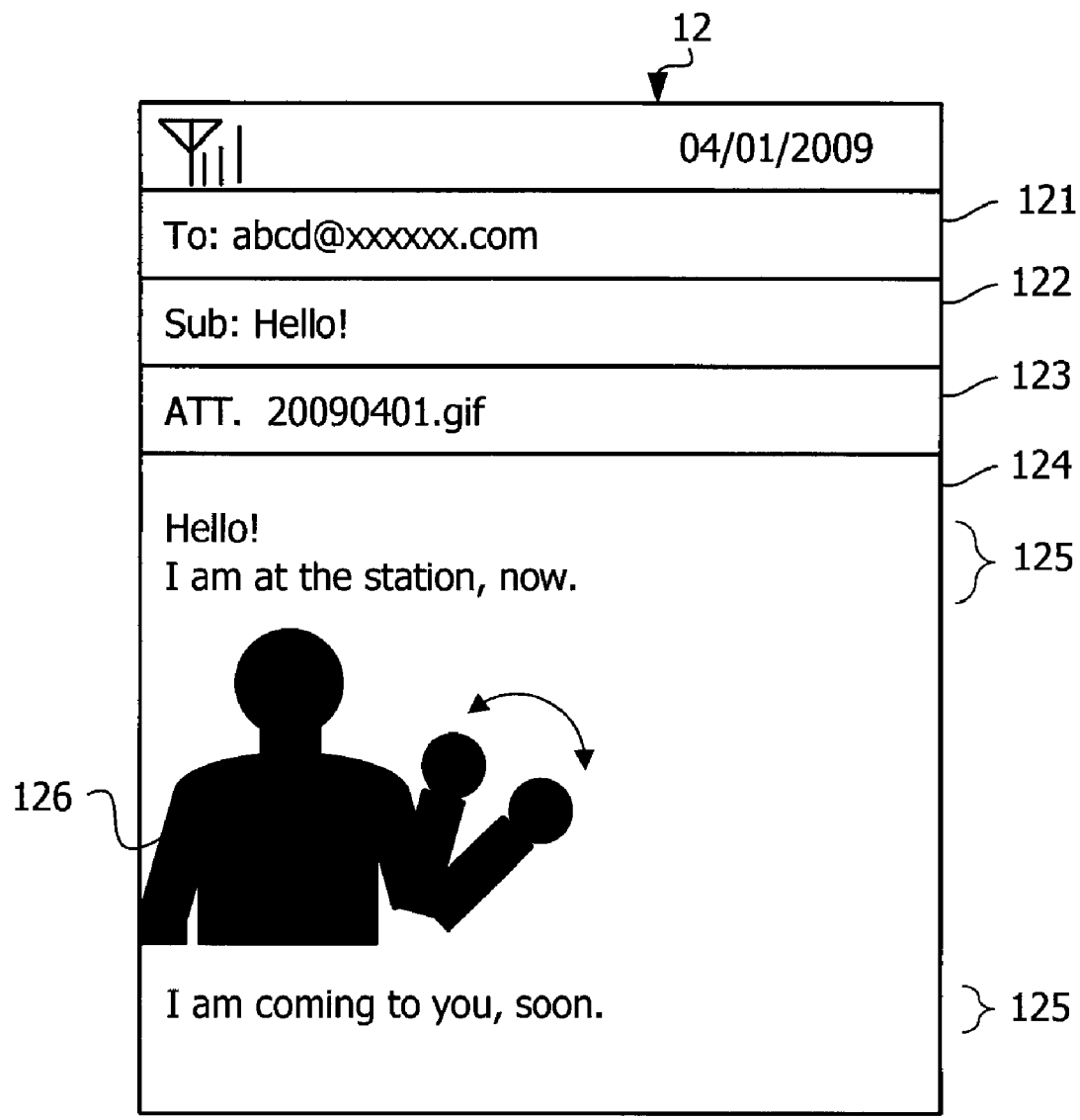
FIG. 5 is a view illustrating contents displayed on a displaying unit in the mobile communication terminal.
Figure 6A:
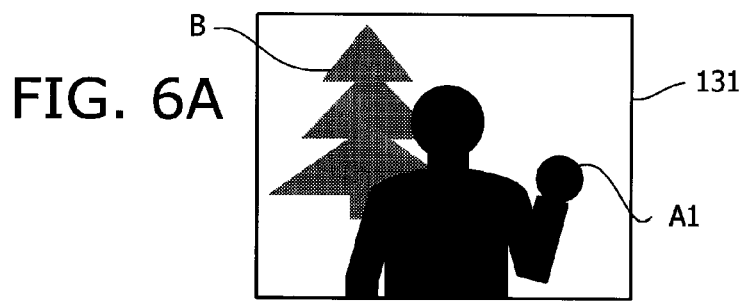
FIGS. 6A to 6E are views illustrating images shot continuously.
Figure 6B:
Figure 6C:
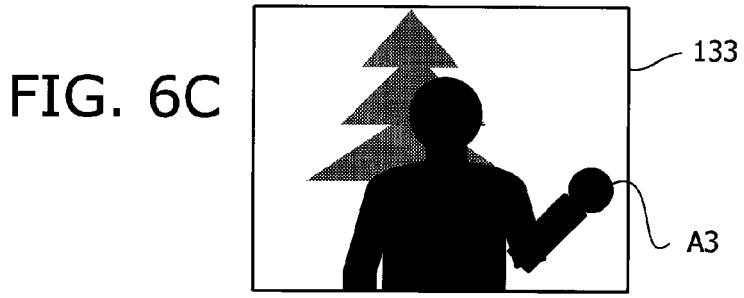
Figure 6D:
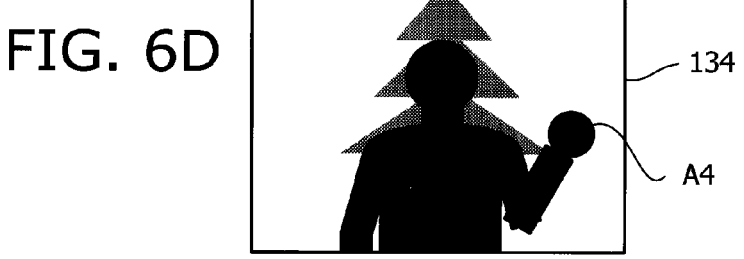
Figure 6E:
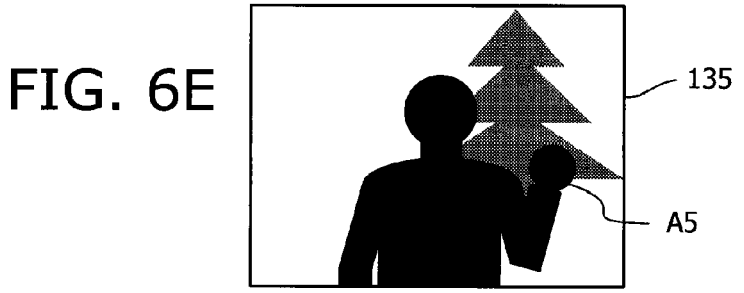

FIG. 5 is a view illustrating contents displayed on the displaying unit 12 at step S16.

As illustrated in FIG. 5, a mail address is displayed at 121, a mail subject: "Hello" is displayed at 122, an attached file name (animation file) is displayed at 123, mail contents are displayed at 125, 125 and content (126) of the animation file is displayed in line at a position of the cursor.

Meanwhile, the controlling unit 1 creates a moving image using the plural images shot at steps S07 to S10 as moving image frames at step S17.

FIGS. 6A to 6E are views illustrating a process (step S13 to step S17) of creating the moving image file.

Five images 131 to 135 shot at steps S07 to S10 are illustrated in FIGS. 6A to 6E. The images 131 to 135 have object image regions A1 to A5, respectively, and further each have an image region of an object "B".

When the images 131 to 135 are reviewed at step S13, the image region of an object "B" does not stay at the same position in all the images 131 to 135. Therefore, the controlling unit 1 determines that the image moving region is found in the whole image region of all the plural shot images, and compresses and encodes each frame of the moving image in accordance with an encoding scheme in conformity with the encoding scheme of MPEG-4 encoding scheme, creating a moving image file.

Then, in accordance with the hyper-text format mail editing program, the controlling unit 1 attaches the moving image file created at step S17 to the mail in the process of writing at step S18.

Figure 7:
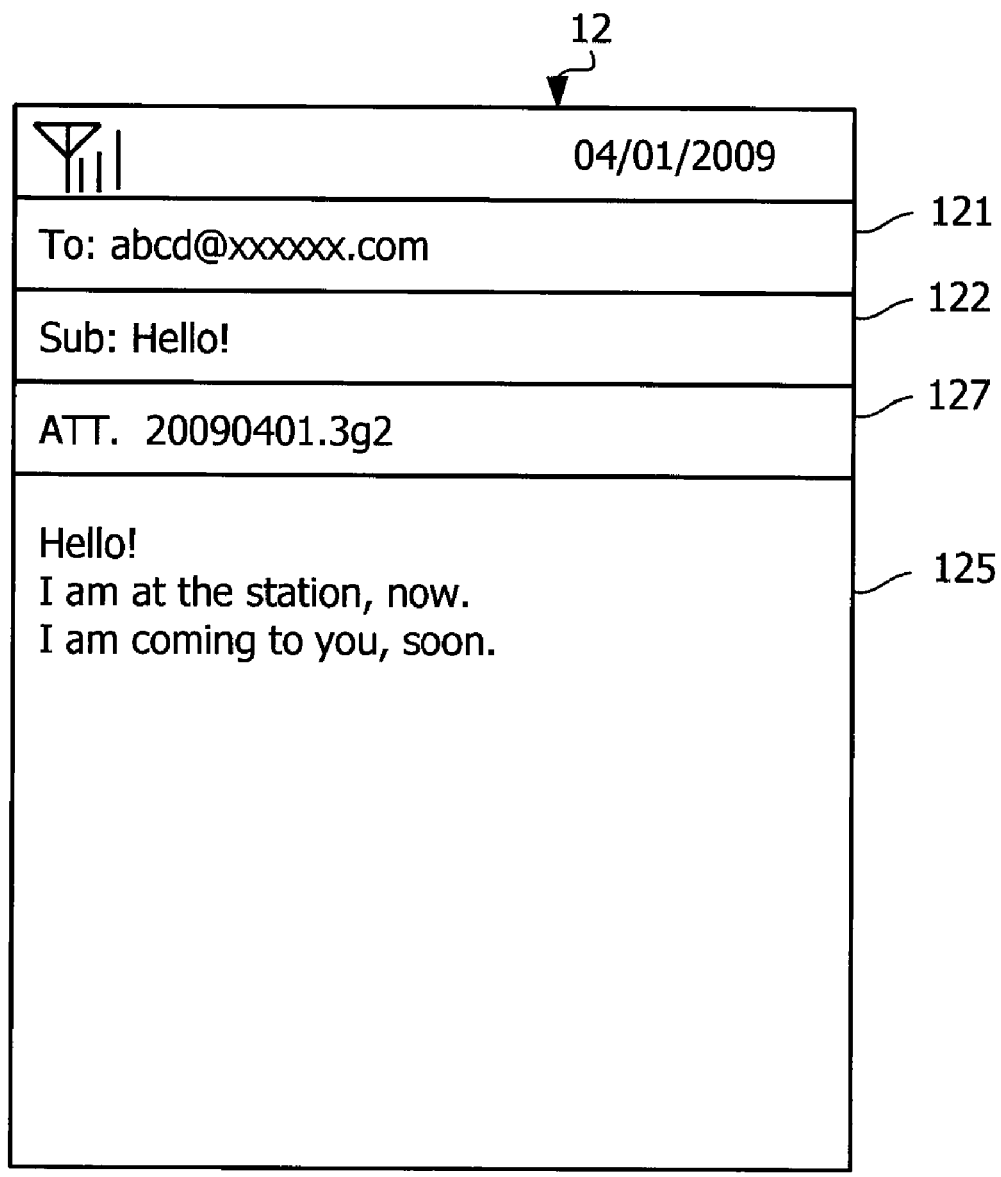
FIG. 7 is a view illustrating contents displayed on the displaying unit of the mobile communication terminal.

FIG. 7 is a view illustrating contents displayed on the displaying unit 12 at step S18.

As illustrated in FIG. 7, a mail address is displayed at 121, a mail subject: "Hello" is displayed at 122, an attached file name (animation file) is displayed at 127 and mail content is displayed at 125. Finishing the process at step S16 or step S18, the controlling unit 1 returns to step S02, again.

When the instruction of terminating the mail writing process has been detected (YES at step S03), the controlling unit 1 judges at step S19 whether or not the instruction of sending the written mail has been given or detected.

When the instruction of sending the written mail has not been detected (NO at step S19), the controlling unit 1 returns to step S02. When the instruction of sending the written mail has been detected (YES at step S19), the controlling unit 1 controls the signal processing unit 5 and the radio communication unit 4 to send the mail address the written mail with the attached file, if any, at step S20 and finishes the process.

As described, depending on judgment of whether or not the plural images continuously shot have been displayed live on the displaying unit 12 for a certain period of time, whether or not non image-moving region is found in a part of image region the plural shot images, and/or whether or not the non image-moving region is found in a part of image region of the plural shot images and is included in the image which is displayed live on the displaying unit 12, the controlling unit 1 creates an animation file using the plural images continuously shot, and further inserts the created animation file in an electronic document in the process of writing, trimming the document, wherein the animation file is less in volume than a moving image. In this way, an electronic document can be produced, which is dynamic and rich in impressiveness and improved in convenience.

Second Embodiment

In the first embodiment, the technique has been described, that creates an animation file of GIF format with the non image-moving region subjected to the transparent process at steps S14 to S15 in FIG. 3.

However, in the case that an area of a transparent region is larger than an area of a non-transparent region in the created animation file, a problem is expected that, when such animation file is displayed in line as GIF icon of the hyper text format mail, the user cannot confirm the non-transparent region, because the area of non transparent region is small.

Further, when the created animation file having a small display size and a low display resolution is displayed on displaying means having a large display size and a high display resolution, another problem is expected that it is hard for the user to confirm the non-transparent region.

When the created animation file having a small display size and a low display resolution is displayed on the displaying means having an aspect ratio different from the animation file to be displayed thereon, a problem is expected that it is hard for the user to confirm the non-transparent region.

In the second embodiment, techniques will be described in detail, which solves the problems described above.

In the second embodiment, like reference numbers and symbols represent like elements and processes of the first embodiment and a further description thereof will be omitted.

In the second embodiment, the description will start with the process at step S14 in FIG. 3.

Figure 8:
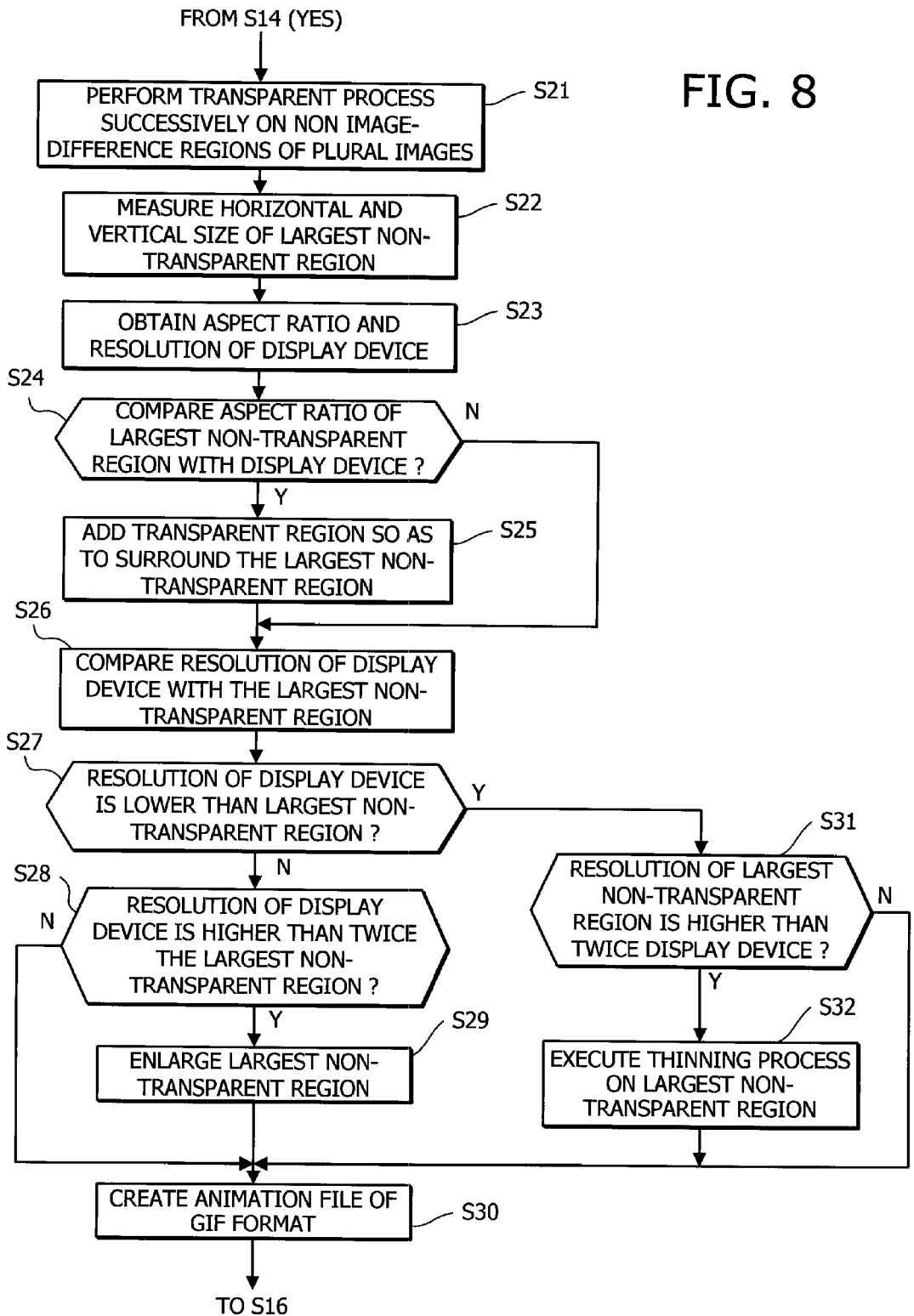
FIG. 8 is a flow chart of a process to be performed in the mail writing mode in a second embodiment.
Figure 9:
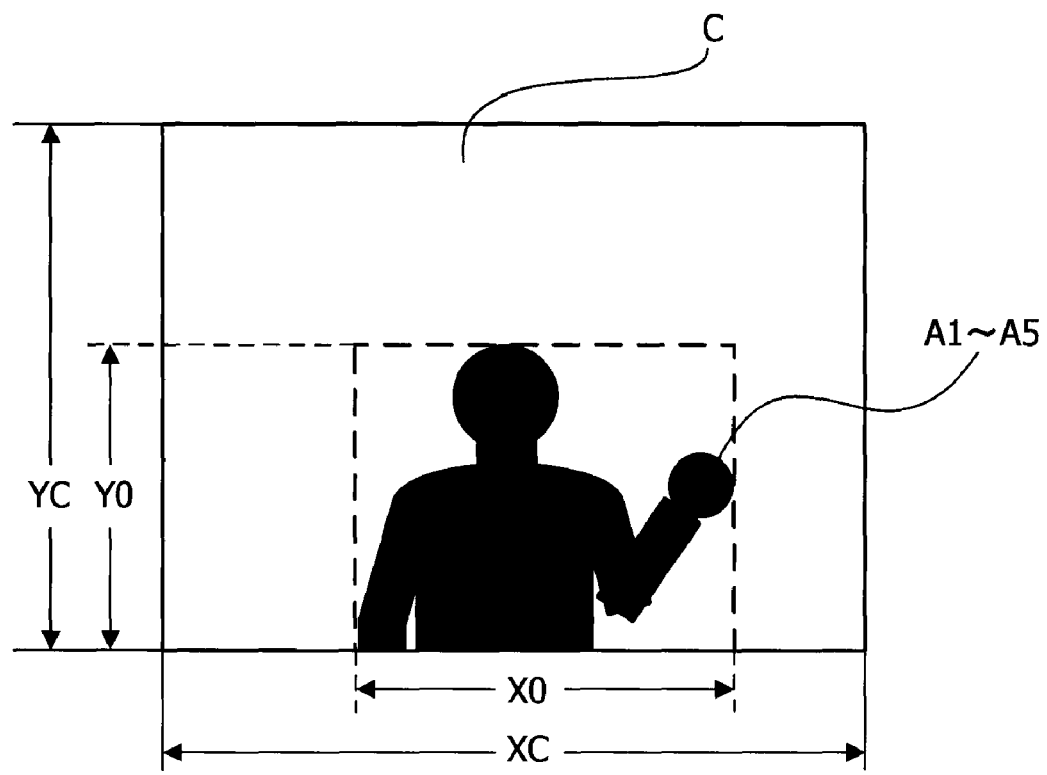
FIG. 9 is a view illustrating a relationship between an aspect ratio of an image having a transparent region and an aspect ratio of a display device.

When it is determined at step S14 that a non image-moving region is included in the image which is currently displayed live on the displaying unit 12 (YES at step S14), the controlling unit 1 performs the transparent process successively on the non image-moving region of the plural shot images at step S21 in FIG. 8. And the controlling unit 1 selects an image having the largest non-transparent region from the plural images whose non image-moving region is subjected to the transparent process, and measures a horizontal and vertical size of the largest non-transparent region at step S22. FIG. 9 is a view prepared for explanation of the process at step S22 and illustrating a relationship between an aspect ratio of the image having the transparent region and an aspect ratio of a display device.

As shown in FIG. 9, the image has a vertical size of YC and a horizontal size of XC, and includes the transparent region "C" and a non-transparent region which corresponds to the largest one out of the non-transparent regions A1 to A5. The largest non-transparent region has a vertical size of YO and a horizontal size of X0. The controlling unit 1 calculates the vertical size of Y0 and horizontal size of XC at step S22.

The controlling unit 1 has selected the image having the largest non-transparent region from the plural images subjected to the transparent process at step S22. In the case image regions processed as the non-transparent regions in the plural shot images represent a moving object image, if the image having the largest non-transparent region is not selected, a part of the non-transparent region of other image subjected to the transparent process can be deleted in the following process. Therefore, the image having the largest non-transparent region is selected to avoid the deletion in the following process.

Note that the operation is described at step S22, in which the object image processed as the non-transparent region in the plural shot images does not change its whole position but moves its portion.

It is supposed that the position of the whole non-transparent region changes between the plural shot images. For instance, some object image subjected to the transparent process displaces in parallel.

In these cases, a position of a non-transparent region of an object image subjected to the transparent process in the first shot image in the plural shot images and a position of a non-transparent region of an object image subjected to the transparent process in the last shot image in the plural shot images are calculated, and a vertical size YO and a horizontal size X0 of the smallest region including the calculated positions are set.

The controlling unit 1 calculates a vertical size YO and a horizontal size X0 of the largest non-transparent region at step S22. Then, the controlling unit 1 obtains at step S23 information of aspect ratio and information of resolution of the display device for displaying an image subjected to the transparent process. There are many ways of obtaining the information of aspect ratio and information of resolution of the display device. When the display device is installed on its own mobile communication terminal, in which the controlling unit 1 is included, the controlling unit 1 obtains the specification data of the mobile communication terminal. When the image is displayed on a display device of a terminal, to which the image is sent from its own mobile communication terminal, the controlling unit 1 obtains the specification data of the display device of the terminal by operating its own mobile communication terminal or via the network.

The controlling unit 1 compares at step S24 the aspect ratio of the largest non-transparent region (vertical size Y0, horizontal size X0) selected at step S22 with the aspect ratio of the display device obtained at step S23.

When it is determined at step S24 that both the aspect ratios are equivalent, the controlling unit 1 advances to step S26. When it is determined at step S24 that both the aspect ratios are not equivalent, the controlling unit 1 advances to step S25.

When it is determined at step S24 that both the aspect ratios are not equivalent, a transparent region is added so as to evenly surround the largest non-transparent region selected at step S22 on the basis of the aspect ration of the display device at step S25.

Figure 10A:
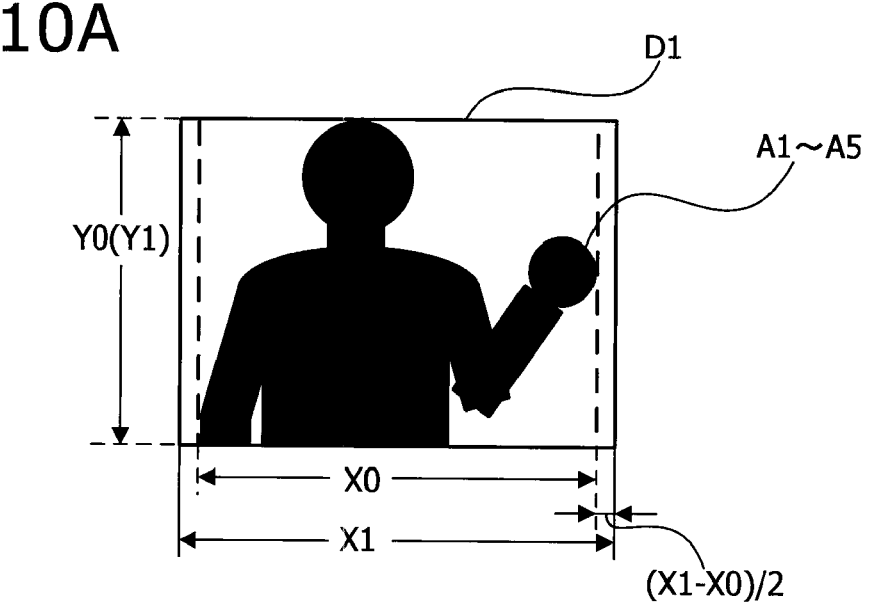
FIGS. 10A and 10B are views each illustrating the largest non-transparent region and the transparent region added thereto.
Figure 10B:
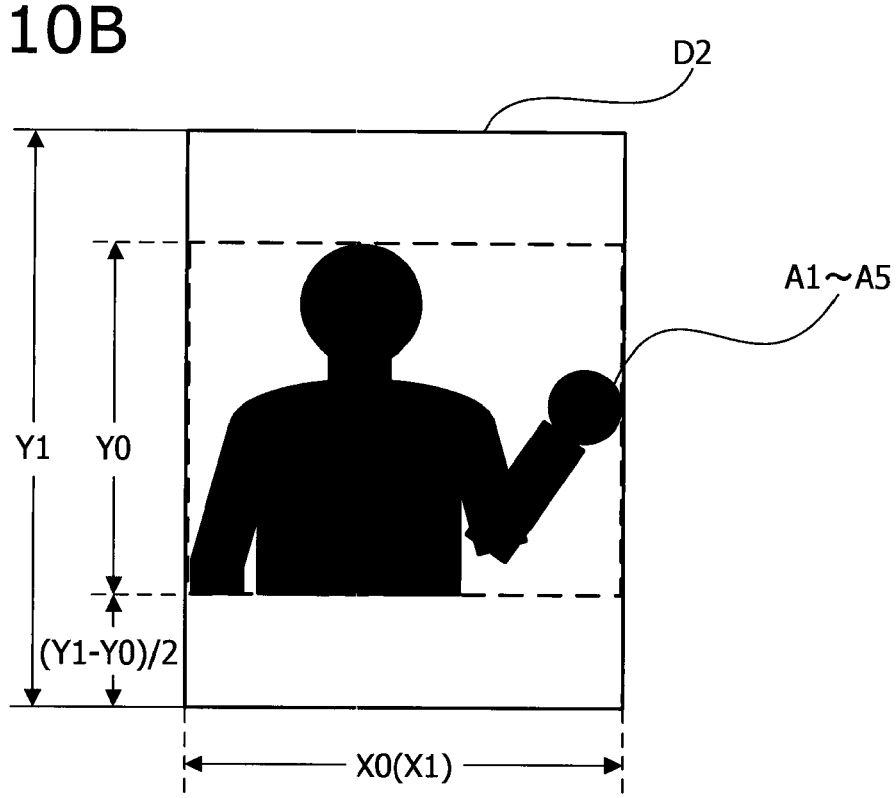

FIGS. 10A and 10B are views illustrating the largest non-transparent region and the transparent region added thereto. As shown in FIG. 10A, the largest non-transparent region (the largest one among the non-transparent regions A1 to A5) has an aspect ratio (X0>Y0), and the display device D1 has an aspect ratio (X1>Y1). But the aspect ratio is different from the aspect ratio of the largest transparent region.

In this case, the controlling unit 1 adds a transparent region around the largest non-transparent region (A1 to A5), making both the aspect ratios equivalent to each other on the basis of the aspect ratio of the display device D1. For instance, as shown in FIG. 10A, the largest non-transparent region (A1 to A5) is short in the horizontal size by (X1−X0) on the basis of the aspect ratio of the display device D1. Therefore, the largest non-transparent region (A1 to A5) is added at the both sides (shown in broken lines) with transparent regions having a width of (X1−X0)/2.

As shown in FIG. 10B, the largest non-transparent region (A1 to A5) has an aspect ratio (X0>Y0), and the display device has an aspect ratio (X1<Y1). In this case, the controlling unit 1 adds a transparent region around the largest non-transparent region (A1 to A5), making both the aspect ratios equivalent to each other on the basis of an aspect ratio of the display device D2. For instance, as shown in FIG. 10B, the largest non-transparent region (A1 to A5) is short in the vertical size by (Y1−Y0) on the basis of the aspect ratio of the display device D2. Therefore, the largest non-transparent region (A1 to A5) is attached at the top and bottom (shown in broken lines) with transparent regions having a width of (Y1−Y0)/2.

The controlling unit 1 compares the resolution of the display device with the resolution of the largest non-transparent region (A1 to A5) at step S26 in FIG. 8.

When it is determined at step S27 that the resolution of the display device is higher than the largest non-transparent region (A1 to A5), the controlling unit 1 judges at step S28 whether or not the resolution of the display device is higher in a vertical and horizontal direction than twice the resolution of the largest non-transparent region (A1 to A5).

When it is determined at step S28 that the resolution of the display device is not less than twice the resolution of the largest non-transparent region (A1 to A5) (YES at step S28), the controlling unit 1 enlarges by pixels the largest non-transparent region (A1 to A5) so as to meet the resolution of the display device at step S29. For instance, when the resolution of the largest non-transparent region (A1 to A5) is equivalent to QVGA resolution (320 pixels×240 pixels) and the resolution of the display device is not less than VGA resolution (640 pixels×400 pixels), the largest non-transparent region (A1 to A5) can be enlarged by pixels to the integral multiple.

Meanwhile, when it is determined at step S28 that the resolution of the display device is not higher than twice the resolution of the largest non-transparent region (A1 to A5) (NO at step S28), the controlling unit 1 does not enlarge by pixels the largest non-transparent region (A1 to A5), and advances to step S30. When the resolution of the largest non-transparent region (A1 to A5) is equivalent to QVGA resolution (320 pixels×240 pixels) and the resolution of the display device is equivalent to HVGA resolution (480 pixels× 320 pixels), the largest non-transparent region (A1 to A5) cannot be enlarged by pixels to the integral multiple.

The controlling unit 1 creates the animation file of FIG format using plural images including the largest non-transparent region (A1 to A5) at step S30.

When it is determined at step S27 that the resolution of the largest non-transparent region (A1 to A5) is higher than the display device, then the controlling unit 1 judges at step S31 whether or not the resolution of the largest non-transparent region (A1 to A5) is higher in a vertical and horizontal direction than twice the resolution of the display device. When it is determined at step S31 that the resolution of the largest non-transparent region (A1 to A5) is not less than twice the resolution of the display device (YES at step S31), then the controlling unit 1 executes a thinning process by pixels on the largest non-transparent region (A1 to A5) at step S32. For instance, when the resolution of the largest non-transparent region (A1 to A5) is not less than VGA (640 pixels×400 pixels), and the resolution of the display device is equivalent to QVGA resolution (320 pixels×240 pixels), the largest non-transparent region (A1 to A5) cannot be thinned by pixels to not larger than a fraction of an integral.

Meanwhile, when it is determined at step S31 that the resolution of the largest non-transparent region (A1 to A5) is less than twice the resolution of the display device (NO at step S31), then the controlling unit 1 does not execute the thinning process by pixels on the largest non-transparent region (A1 to A5) and advances to step S30. For instance, when the resolution of the largest non-transparent region (A1 to A5) is equivalent to VGA resolution (640 pixels×400 pixels), and the resolution of the display device is equivalent to HVGA resolution (480 pixels×320 pixels), the largest non-transparent region (A1 to A5) cannot be thinned by pixels to not larger than a fraction of an integral.

In the second embodiment, since the size of the non-transparent region is changed depending on the aspect ratio and/or resolution of the display device, the user can easily confirm the non transparent region independently of the resolution of the display device.

In the embodiments, the animation file of GIF format is created from plural images shot continuously, and is inserted in the electronic document in the process of writing to trim the same document, but the created animation file of GIF format can be used for other purpose. For instance, the embodiments have been described, in which the present invention is applied to the mobile communication terminals, but the animation file can be displayed as an image for incoming calls and/or can be used as informing icons such as an icon for indicating a sending/receiving mails and an alarm icon.

Third Embodiment

In the first embodiment, it is decided depending on the plural images shot continuously, whether to create the animation file of GIF format or to create the moving image file. But a file format to be created can be decided depending on the mail format. In the third embodiment, the case where the file format is selected depending on the mail format is described in detail.

In the third embodiment, like reference numbers and symbols represent like elements and processes of the first and second embodiment and a further description thereof will be omitted.

Figure 11:
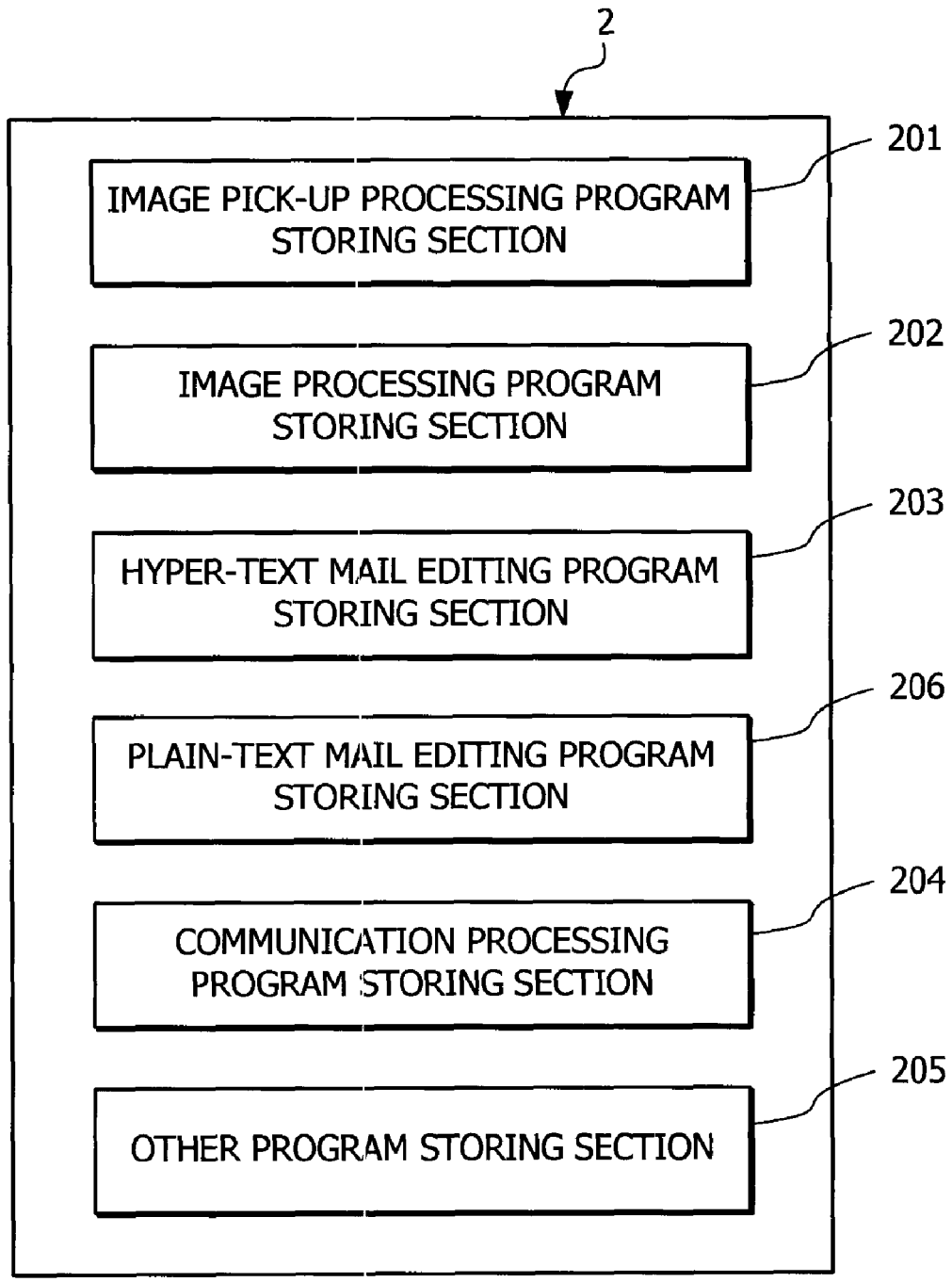
FIG. 11 is a view showing on a conceptual basis, contents of the program memory of the mobile communication terminal in the second embodiment.

In the third embodiment, the program memory 2 stores a program, which the controlling unit 1 executes to operate the mobile communication terminal. More specifically, as shown in FIG. 11, the program memory 2 has storing sections for storing various programs for the controlling unit 1 to perform the present invention, and other program storing section 205 for storing other programs, wherein the storing sections include an image pick-up processing program storing section 201, image processing program storing section 202, hyper-text mail editing program storing section 203, plain-text mail editing program storing section 206, and communication processing program storing section 204. The programs are read from these storing sections in response to an instruction given by the controlling unit 1.

Figure 12:
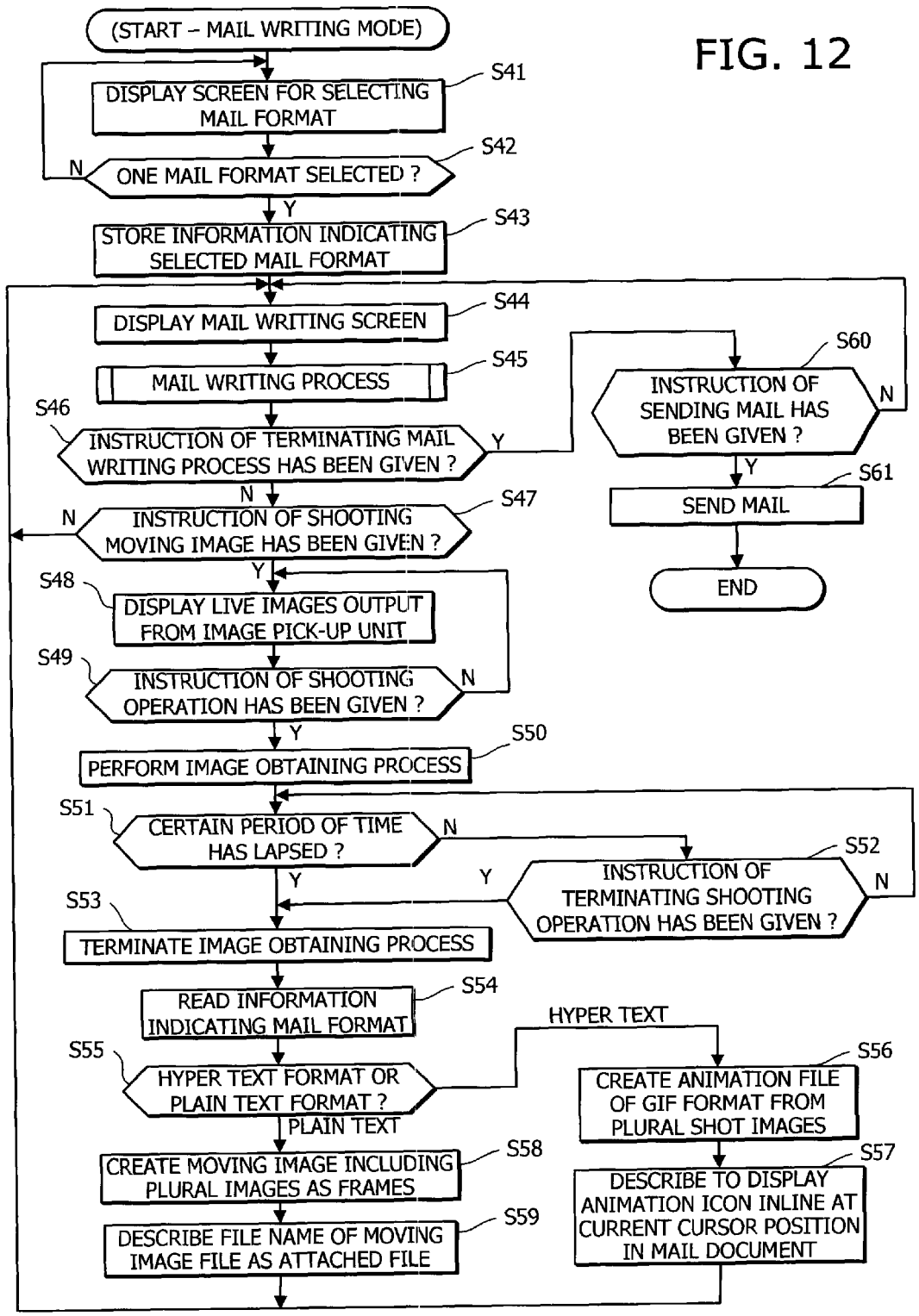
FIG. 12 is a flow char of a process to be performed in the mail writing mode in a third embodiment.

FIG. 12 is a flow chart of a process performed by the mobile communication terminal in the mail writing mode.

When the power is turned on, the mobile communication terminal reads and executes the program from the communication processing program storing section 204 of the program memory 2, performing the negotiation process and the communication process with the external radio communication network.

And when the mail writing mode has been set, a screen is displayed for prompting the user to select one of mail formats (a mail of a plain text format and a mail of a hyper text format) at step S41. The controlling unit 1 detects operation of the cursor key 142 or operation of the enter key 143 in the key input unit 14, determining which mail format (hyper text format or plain text format) has been selected at step S42.

When it is determined at step S42 any mail format has not been selected (NO at step S42), the controlling unit 1 returns to step S41. Meanwhile, when it is determined at step S42 one of the mail formats has been selected (YES at step S42), the controlling unit 1 temporarily stores information indicating the selected mail format in a predetermined area of the memory 15 at step S43, and advances to step S44.

The controlling unit 1 reads and executes the editing program selected and detected at step S42 from the hyper-text mail editing program storing section 203 or the plain-text mail editing program storing section 206, and displays the mail writing screen on the displaying unit 12 at step S44.

The controlling unit 1 detects a user's operation of the ten key 141, the cursor key 142, and the enter key 143, performing the inputting process of an electronic document (contents of an electric mail), whereby a mail is written at step S45. Further, the controlling unit 1 judges at step S46 whether or not the instruction of terminating the mail writing process has been given or detected.

Note that since the mail written or produced in the mail writing process is of a hyper text format, not only characters are entered, but contents which are designated with Html format tags can be edited at will. For example, character color and background color can be edited, sizes of character fonts can be changed, characters can be scrolled, and further a layout of the mail can be changed.

When the instruction of terminating the mail writing process has been detected (YES at step S46), the controlling unit 1 judges at step S60 whether or not an instruction of sending the written mail has been given or detected. When the instruction of terminating the mail writing process has not been detected (NO at step S46), the controlling unit 1 judges at step S47 whether or not an instruction of shooting a moving image has been given or detected. The judgment is made based on whether or not a certain operation has been performed on the input unit 14.

When the instruction of shooting a moving image has not been detected (N0 at step S47), the controlling unit 1 returns to step S44. When the instruction of shooting a moving image has been detected (YES at step S47), the controlling unit 1 reads and executes the programs from the image pick-up processing program storing section 201 and the image processing program storing section 202, thereby starting up the image pick-up unit 10 and the image pick-up processing unit 11.

The controlling unit 1 temporarily stores the written mail (electronic document) in the memory 15, and meanwhile, periodically drives the image pick-up unit 10 to successively output images, and controls the image pick-up processing unit 11 and the display controlling unit 13 to display live images output from the image pick-up unit 10 on the displaying unit 12 at step S48.

With the live image displayed on the displaying unit 12, the controlling unit 1 judges at step S49 whether or not an instruction of the shooting operation has been given or detected. The judgment is made based on whether or not the user has operated the enter key 143.

When the instruction of the shooting operation has not been detected (NO at step S49), the controlling unit 1 returns to step S48. When the instruction of the shooting operation has been detected (YES at step S49), the controlling unit 1 makes the image pick-up processing unit 11 and the display controlling unit 13 start and perform the image obtaining process for a certain period of time to continuously obtain images at step S50. The controlling unit 1 judges at step S51 whether or not a certain period of time has lapsed, which period corresponds to volume of a moving image file that is allowed to attach to the mail. When the certain period of time has not lapsed (NO at step S51), the controlling unit 1 judges at step S52 whether or not the instruction of terminating the shooting operation has been given or detected. The judgment is made based on whether or not the user has operated the enter key 143.

When the instruction of terminating the shooting operation has not been detected (NO at step S52), the controlling unit 1 returns to step S51. When it is determined that the certain period of time has lapsed (YES at step S51), and/or when it is determined that the instruction of terminating the shooting operation has been detected (YES at step S52), the controlling unit 1 instructs the image pick-up unit 10 and the image pick-up processing unit 11 to terminate the image obtaining process at step S53. The controlling unit 1 reads from the memory 15 the information indicating the selected mail format stored temporarily at step S54.

Further, the controlling unit 1 judges at step S55 whether the information indicates a mail of a hyper text format or a mail of a plain text format. When the information indicates a mail of a hyper text format at step S55, the controlling unit 1 creates an animation file of GIF format from plural shot images at step S56.

Creation of the animation file at step S56 will be described with reference to FIGS. 4A to 4E.

It is assumed that five images 111 to 115 are shot at steps S50 to S53 as shown in FIGS. 4A to 4E. The images 111 to 115 have object images 1A to 5A, respectively and each have an image region of an object "A". The animation file of GIF format, which includes five frames is created from these five images.

Creating the animation file at step S56, the controlling unit 1 controls the display controlling unit 13 to read and display the temporarily stored mail data on the displaying unit 12.

In accordance with the hyper text format mail editing program, the controlling unit 1 attaches the created animation file to the mail in the process of writing and describes to display an animation GIF icon of the created animation file in line at a current position of the cursor in the mail in the process of writing at step S57.

Figure 13:
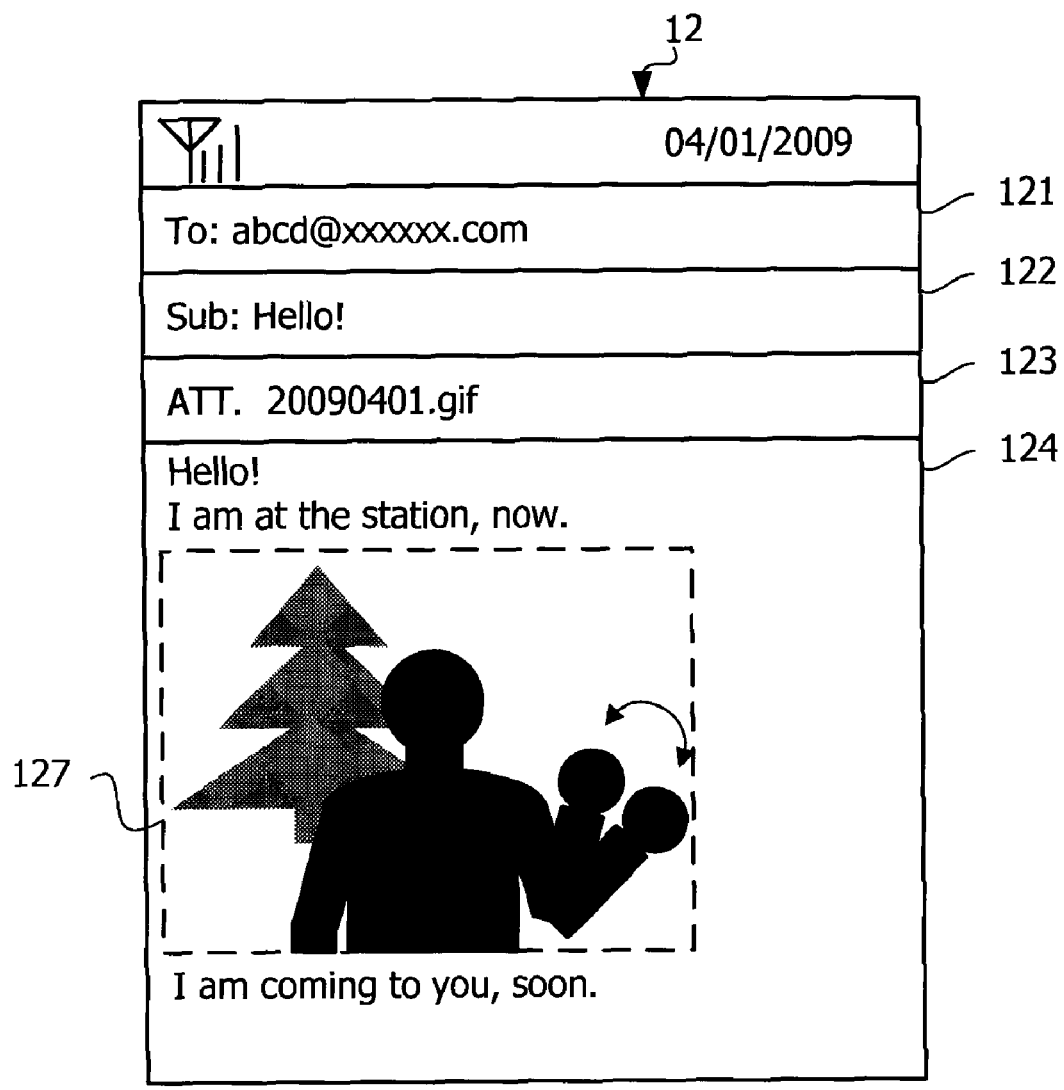
FIG. 13 is a view illustrating contents displayed on the displaying unit of the mobile communication terminal.

FIG. 13 is a view illustrating an image displayed on the displaying unit 12.

The view of FIG. 13 shows the process in which the user is writing a mail. That is, the user writes—Hello! I am at the station. I am coming to you, soon.—. After having written—Hello! I am at the station.—and stopping writing, he or she shoots a moving image, and then begins writing—I am coming to you, soon.—

In FIG. 13, the mail address is indicated by 121, the mail subject, "Hello!" is indicated by 122, Attachment (animation file)) is indicated by 123, and Mail content is indicated by 124. As shown in FIG. 13, GIF icon 127, the content of the animation file is inserted between the mail contents "Hello! I am at the station." and "I am coming to you, soon."

When the information indicates a mail of a plain text format at step S55, the controlling unit 1 creates a moving image file having plural shot images as frames at step S58, wherein each frame is compressed and encoded in accordance with the encoding scheme in conformity with the encoding scheme of MPEG-4 encoding scheme.

Then, in accordance with the hyper-text format mail editing program, the controlling unit 1 attaches the moving image file created at step S58 to the mail in the process of writing at step S59.

An image displayed on the displaying unit 12 at step S59 is substantially the same as, illustrated in FIG. 7. After step S57 or S59, the controlling unit 1 returns to step S44. When the instruction of terminating the mail writing process has been detected (YES at step S46), the controlling unit 1 judges at step S60 whether or not an instruction of sending the written mail has been given or detected.

When the instruction of sending the written mail has not been detected at step S60 (NO at step S60), the controlling unit 1 returns to step S44. When the instruction of sending the written mail has been detected at step S60 (YES at step S60), the controlling unit 1 controls the signal processing unit 5 and the radio communication unit 4 to send the mail address the written mail with the attached file, if any, at step S61 and finishes the process.

In the image processing apparatus of the invention, it is decided depending on the selected mail text format, whether to create the animation file of GIF format or to create the moving image file from the plural shot images. Therefore, the shot images can be attached to the mail independently of the document format of the mail.

In the third embodiment, the mail format, that is, a plain text format or a hyper text format, is selected before writing a mail. But the mail format can be decided depending on which program has been executed, the hyper text editing program or the plain text editing program, before the mail writing process is switched to the moving image shooting process. In the above case, there is no need to set the mail format before writing a mail, the user can use the mobile communication terminal more conveniently.

In the embodiments of the invention, the mobile communication terminal in which the present invention is applied has been described, but the present invention can be applied to any hardware systems and software such as computer software and network server systems, which create an animation file using plural images continuously obtained in an image shooting operation.

What is claimed is:

1. An image processing apparatus comprising:
   a document creating unit for creating a document including characters;
   a displaying unit for displaying data;
   an image pick-up unit for shooting an object;
   an image pick-up controlling unit for controlling the image pick-up unit to continuously shoot an object, thereby obtaining a plurality of continuously shot images;
   a selecting unit for selecting between creating an animation file and creating a moving image file from the plurality of continuously shot images obtained by the image pick-up controlling unit;
   a creating unit for creating: (i) an animation file using the plurality of continuously shot images obtained by the image pick-up controlling unit, when the selecting unit selects creating an animation file, wherein the plurality of continuously shot images are used as frames of the animation file, and (ii) a moving image file using the plurality of continuously shot images obtained by the image pick-up controlling unit, when the selecting unit selects creating a moving image file, wherein the plurality of continuously shot images are used as frames of the moving image file; and
   a display controlling unit for controlling the displaying unit to display: (i) characters of the document created by the document creating unit with the animation file inserted in a body of the document, wherein the animation file is created by the creating unit, and (ii) the moving image file created by the creating unit as an attachment file to the document created by the document creating unit.

2. The image processing apparatus according to claim 1, further comprising:
a judging unit for judging whether or not same image regions are found in common in the plurality of continuously shot images obtained by the image pick-up controlling unit,
wherein the selecting unit selects creating the animation file from the plurality of continuously shot images obtained by the image pick-up controlling unit, when the judging unit decides that the same image regions are found in common in the plurality of continuously shot images obtained by the image pick-up controlling unit.

3. The image processing apparatus according to claim 2, wherein the judging unit further judges whether or not the same image regions are found in plural images that are obtained by the image pick-up controlling unit after the plurality of continuously shot images are obtained by the image pick-up controlling unit, and
wherein the selecting unit selects creating an animation file from the plurality of continuously shot images obtained by the image pick-up controlling unit, when the judging unit judges that (i) the same image regions are found in common in the plurality of continuously shot images obtained by the image pick-up controlling unit, and (ii) the same image regions are found in the plural images obtained by the image pick-up controlling unit.

4. The image processing apparatus according to claim 1, wherein the animation file created by the creating unit includes same image regions found in common in the plurality of images as transparent regions and remaining image regions other than the same image regions in the plurality of images as non-transparent regions, wherein the remaining image regions include the object image, and
wherein the image processing apparatus further comprises:
a size calculating unit for calculating a size of the non-transparent region of the animation file;
a size comparing unit for comparing the size of the non-transparent region of the animation file calculated by the size calculating unit with a display size of the animation file to be displayed; and
a size changing unit for changing the size of the non-transparent region depending on a result of the comparison made by the size comparing unit.

5. The image processing apparatus according to claim 1, wherein the animation file created by the creating unit has same image regions found in common in the plurality of images as transparent regions and remaining image regions other than the same image regions in the plurality of images as non-transparent regions, wherein the remaining image regions include the object images, and
wherein the image processing apparatus further comprises:
an aspect ratio calculating unit for calculating an aspect ratio of the non-transparent region of the animation file;
an aspect ratio comparing unit for comparing the aspect ratio of the non-transparent region of the animation file calculated by the aspect ratio calculating unit with an aspect ratio of a display size of the animation file to be displayed; and
an aspect ratio adjusting unit for adding an additional transparent region to the animation file, thereby adjusting the aspect ratio of the animation file depending on a result of the comparison made by the aspect ratio comparing unit.

6. The image processing apparatus according to claim 2, wherein the selecting unit selects creating the moving image file from the plurality of continuously shot images obtained by the image pick-up controlling unit, when the judging unit decides that the same image regions are not found in common in the plurality of continuously shot images obtained by the image pick-up controlling unit.

7. The image processing apparatus according to claim 6, wherein the judging unit judges whether or not the same image regions are located in plural images that are obtained by the image pick-up controlling unit after the plurality of continuously shot images are obtained by the image pick-up controlling unit, and
wherein the selecting unit selects creating a moving image file from the plurality of continuously shot images obtained by the image pick-up controlling unit, when the judging unit judges that (i) the same image regions are not found in common in the plurality of continuously shot images obtained by the image pick-up controlling unit, and (ii) the same image regions are not found in the plural images obtained by the image pick-up controlling unit.

8. The image processing apparatus according to claim 1, wherein the judging unit judges whether a file format of the document is appropriate for display by the display controlling unit, and
wherein the selecting unit selects creating the animation file from the plurality of continuously shot images obtained by the image pick-up controlling unit with the animation file inserted in the body of the document, when the judging unit determines that the file format of the document is appropriate for display by the display controlling unit.

9. The image processing apparatus according to claim 1, wherein the judging unit judges whether a file format of the document is appropriate for display by the display controlling unit, and
wherein the selecting unit selects creating the moving image file from the plurality of continuously shot images obtained by the image pick-up controlling unit as the attachment file to the document created by the document creating unit, when the judging unit determines that the file format of the document is appropriate for display by the display controlling unit.

10. The image processing apparatus according to claim 1, further comprising a sending unit for sending, to an external apparatus, the animation file or the moving image file created by the creating unit.

11. An image processing method comprising:
inputting a plurality of continuously shot images;
selecting between creating an animation file and creating a moving image file from the plurality of continuously shot images;
creating an animation file using the plurality of continuously shot images, when creating an animation file is selected, wherein the plurality of continuously shot images are used as frames of the animation file;
creating a moving image file using the plurality of continuously shot images, when creating a moving image file is selected, wherein the plurality of continuously shot images are used as frames of the moving image file;
controlling to display characters of a document file with the created animation file inserted in a body of the document file; and
controlling to display the created moving image file as an attachment file to the document file.

12. A non-transitory computer readable recording medium having a computer program recorded thereon, the computer program when executed controlling a computer to perform functions comprising:
- inputting a plurality of continuously shot images;
- selecting between creating an animation file and creating a moving image file from the plurality of continuously shot images;
- creating an animation file using the plurality of continuously shot images, when creating an animation file is selected, wherein the plurality of continuously shot images are used as frames of the animation file;
- creating a moving image file using the plurality of continuously shot images, when creating a moving image file is selected, wherein the plurality of continuously shot images are used as frames of the moving image file;
- controlling to display characters of a document file with the created animation file inserted in a body of the document file; and
- controlling to display the created moving image file as an attachment file to the document file.

13. A non-transitory computer readable recording medium mountable on an image processing apparatus, wherein the image processing apparatus includes a computer, an image pick-up unit for continuously shooting an object, a document creating unit for creating a document including characters, and a displaying unit for displaying data, and wherein the recording medium has recorded thereon a computer program for controlling the computer to function as units comprising:
- an image pick-up controlling unit for controlling the image pick-up unit to continuously shoot an object, thereby obtaining a plurality of continuously shot images;
- a selecting unit for selecting between creating an animation file and creating a moving image file from the plurality of continuously shot images obtained by the image pick-up controlling unit;
- a creating unit for creating: (i) an animation file using the plurality of continuously shot images obtained by the image pick-up controlling unit, when the selecting unit selects creating an animation file, wherein the plurality of continuously shot images are used as frames of the animation file, and (ii) a moving image file using the plurality of continuously shot images obtained by the image pick-up controlling unit, when the selecting unit selects creating a moving image file, wherein the plurality of continuously shot images are used as frames of the moving image file; and
- a display controlling unit for controlling the displaying unit to display: (i) characters of the document created by the document creating unit with the animation file inserted in a body of the document, wherein the animation file is created by the creating unit, and (ii) the moving image file created by the creating unit as an attachment file to the document created by the document creating unit.

* * * * *